United States Patent [19]
Wilkinson, Jr.

[11] Patent Number: 4,845,579
[45] Date of Patent: Jul. 4, 1989

[54] DISC DRIVE INCORPORATING AUTOMATIC WEAR COMPENSATION FOR A PIVOTED ARM

[75] Inventor: Richard A. Wilkinson, Jr., Santa Cruz, Calif.

[73] Assignee: Seagate Technology, Inc., Scotts Valley, Calif.

[21] Appl. No.: 115,536

[22] Filed: Oct. 30, 1987

[51] Int. Cl.⁴ .......................... G11B 5/55; G11B 21/08
[52] U.S. Cl. .................................................. 360/106
[58] Field of Search ............. 360/106, 104, 105, 109, 360/97–99

[56] References Cited

U.S. PATENT DOCUMENTS

| | | |
|---|---|---|
| 4,556,924 | 12/1985 | Quist, Jr. et al. .................. 360/106 |
| 4,631,611 | 12/1986 | Schneider ............................ 360/106 |
| 4,654,737 | 3/1987 | Hopkins et al. ..................... 360/106 |
| 4,745,504 | 5/1988 | Foote .................................. 360/106 |

Primary Examiner—Robert S. Tupper
Assistant Examiner—David J. Severin
Attorney, Agent, or Firm—Flehr, Hohbach, Test, Albritton & Herbert

[57] ABSTRACT

In a disc drive, a lightweight, elongate actuator arm is provided supporting a high strength flexure. One end of the actuator arm carries a gear sector having teeth that mesh with a pinion carried on the stepper motor shaft. The gear sector and pinion are biased into engagement by a spring whose force extends directly along the access of the elongate actuator arm. The flexure supporting the transducer head extends out to the side of the actuator arm over the disc, and is positioned over selected tracks on the disc with rotation of the gear across the sector faces.

8 Claims, 4 Drawing Sheets

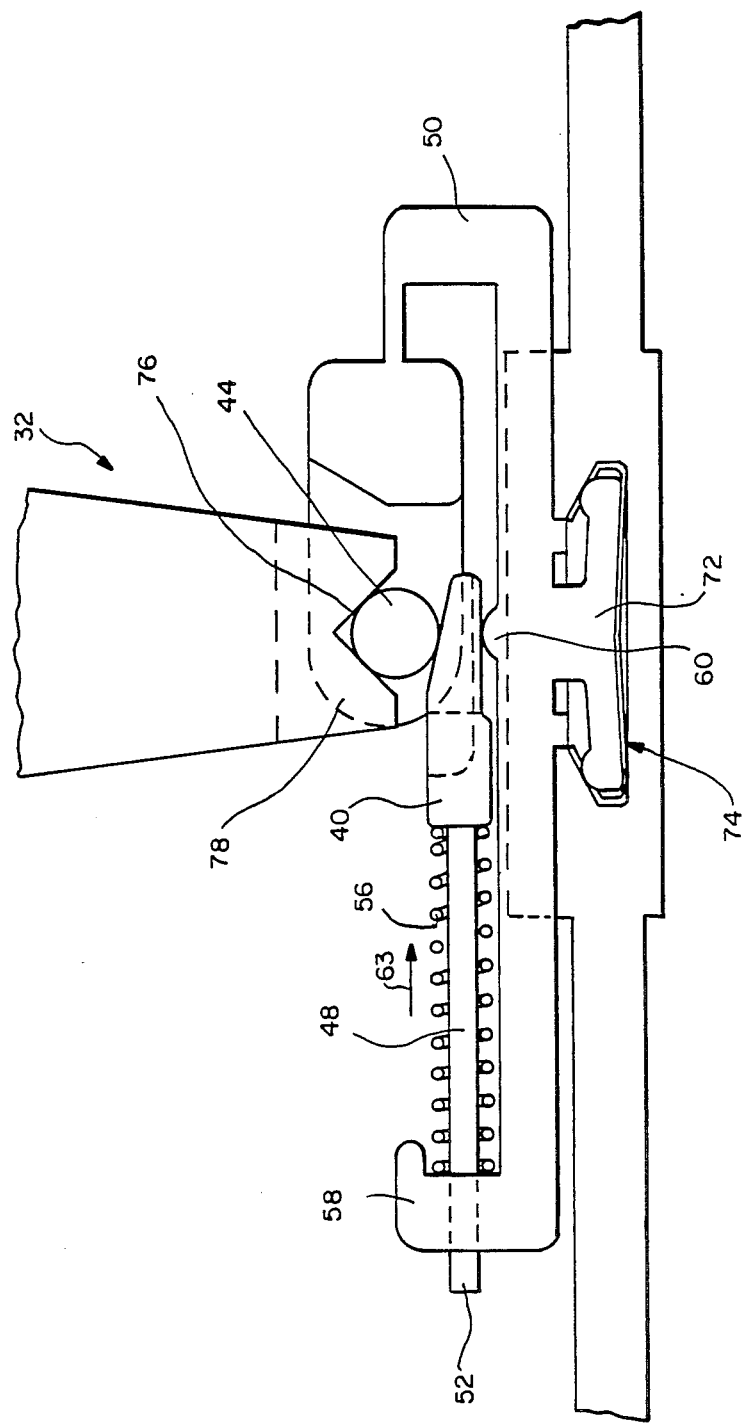
FIG.—2

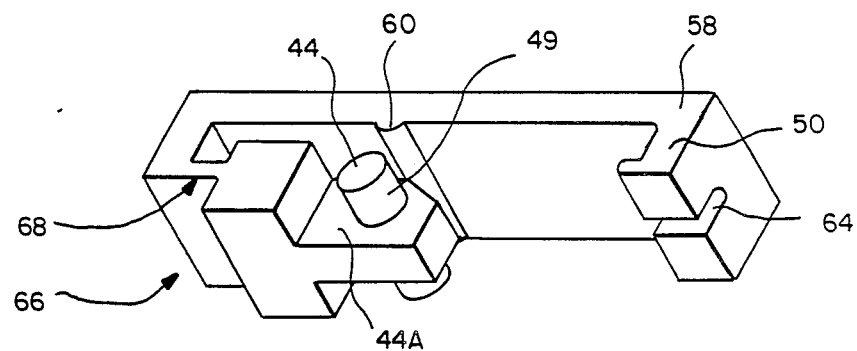
FIG.—3A
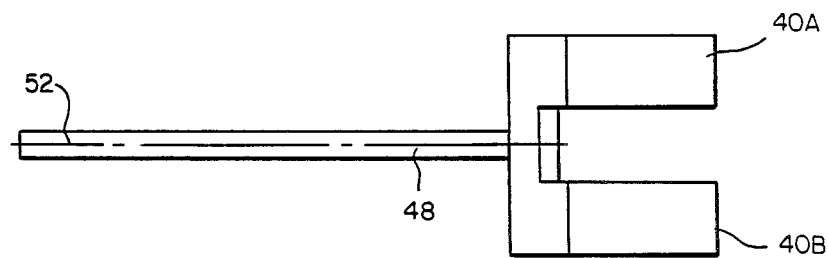
FIG.—3B
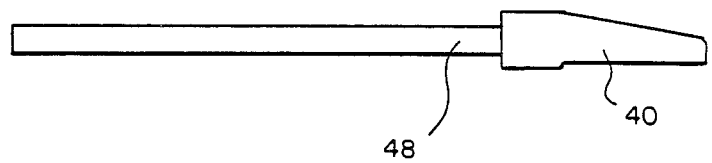
FIG.—3C

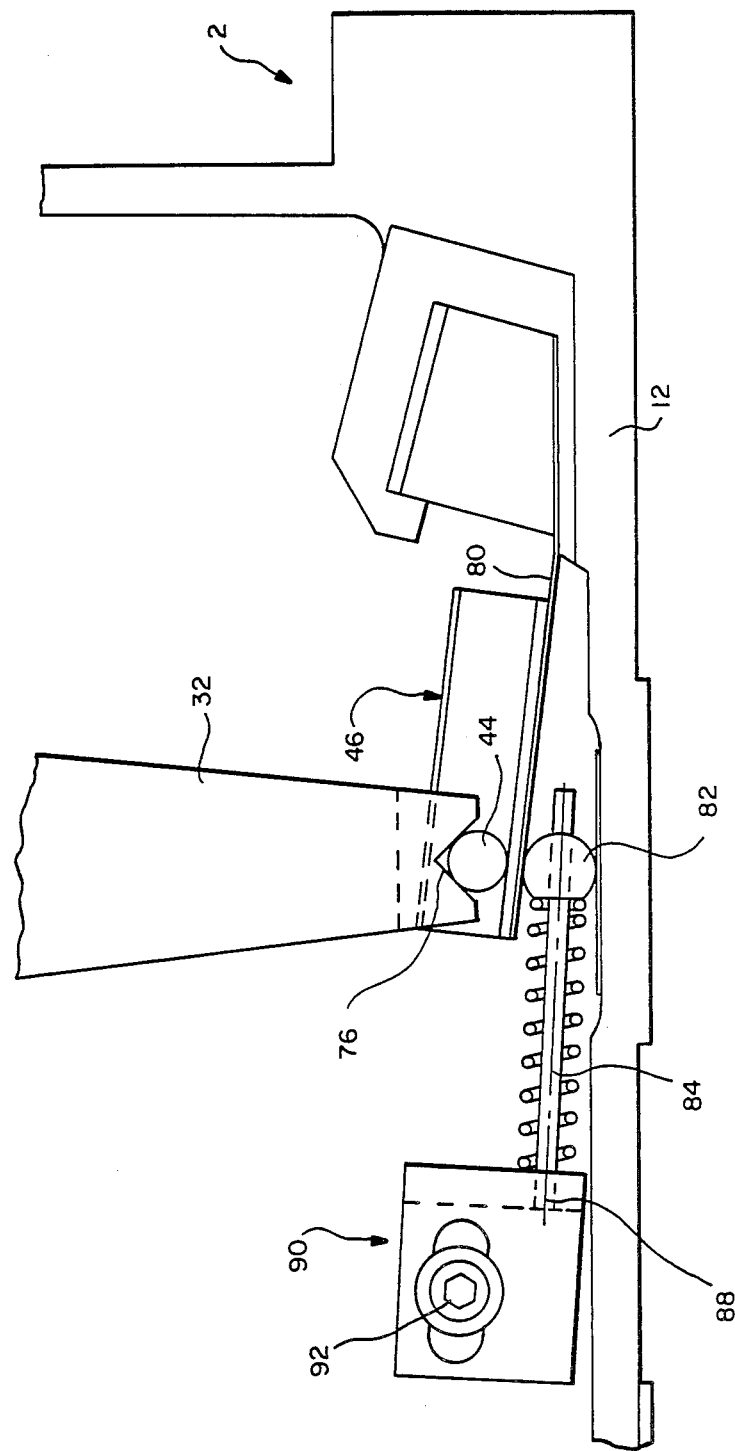
FIG.—4

DISC DRIVE INCORPORATING AUTOMATIC WEAR COMPENSATION FOR A PIVOTED ARM

FIELD OF THE INVENTION

This invention is directed generally to the field of disc drives incorporating rotary actuators, and more particularly to an improved pivot mechanism for the actuator.

BACKGROUND OF THE INVENTION

Disc drive machines record and reproduce information stored on concentric circular or spiral tracks on magnetic or optical discs. Tracks are written and read by magnetic heads which must be accurately positioned over one of the tracks on the surface of the disc.

The common form of rotary actuator includes a head arm, flexure, read/write transducer and actuator arm extending out from a pivot. Extending from the pivot to essentially form a V-shaped arm assembly is an actuator arm which in turn is coupled to an actuator motor. Known rotary actuator mechanisms require a stable pivot mechanism to support the actuator arm and head support arm.

The pivot mechanism in prior art rotary actuators generally consists of a shaft supporting the juncture of two arms, i.e., an actuator drive arm coupled to the actuator motor and head arm. This shaft may include, to maintain the actuator arm alignment, two high precision ball bearings, spring retainers, preload springs, plus attachment means to the base casting and the arm or arms.

The pivot point of the actuator arm is typically mounted for rotation about a fixed pivot point. However, assembly of this pivot mechanism is expensive and time consuming to accomplish with proper alignment and a tight fit between arm and pinion. It has previously been proposed, in the above-referenced patent application, to springload the pivot point of the actuator arm, thereby biasing the rack or sector gear at the head end of the arm against the pinion carried on the surface of the actuator motor shaft. However, it is difficult to maintain sufficient spring force for an extended period of time. Under shock and vibration conditions along the axis of the actuator arm, the arm was subject to sudden unloading from the face of the pinion. Further, the preload created by the steel suspension against the arm tends to change with time; in fact, as parts wear the pivot point may effectively move.

Another integral portion of any actuator mechanism is a transmission coupling between actuator motor shaft and drive arm while maintaining a mechanical resonance above the electrical band pass requirements. Typically, the motor shaft is located perpendicular to the actuator arm and coupled thereto through bands which wind and unwind on the pulley with rotation of the shaft, thereby moving the actuator arm back and forth.

An objective herein is to eliminate drive bands used to couple the actuator motor to the actuator arm to control track accessing. Prior efforts have been made in this direction by providing a frictional coupling between a sector at the end of the actuator arm and the motor shaft. However, such a connection is clearly subject to misalignment in the event of shock, and accurate realignment can be quite difficult. Also, the frictional coupling effect can diminish with time and particles can be shed from this coupling transmission that are harmful to the operation of the drive transmission.

SUMMARY OF THE INVENTION

It is an objective of this invention to provide an improved rotary actuator arm assembly for use in a disc drive and provide high mechanical resonance frequency.

Due to read/write head positioning requirements, the pivot mechanism must offer high precision reliability, high resonance frequency and low mechanical resistance. It is an objective herein to meet these design requirements in an actuator assembly that is easily assembled and maintained.

It is an objective herein to provide a significantly improved pivot mechanism in terms of simplicity of design and ease of assembly as well as having a significantly reduced parts count.

It is a further objective herein to provide a simple and highly reliable pivot mechanism which still offers the required precision and reliability of other, more complex pivot mechanisms.

Another objective is to provide a coupling between actuator arm and motor shaft pulley that relies on neither belts nor pure friction.

Another objective is to provide an actuator arm that is highly resistant to shock which could otherwise decouple the rack and pinion of the actuator drive and provide a high mechanical resonance frequency.

Yet another objective herein is to provide a means for establishing a constant preload against the end of the actuator arm.

The above and other objectives are achieved herein by replacing the normal bearing pivot assembly with a lightweight actuator arm supported on a high strength flexure. The flexure supporting one end of the actuator arm is mounted on the housing casting for stability. The opposite end of the actuator arm carries a gear sector having teeth that mesh a pinion carried on an actuator motor shaft. The gear sector and pinion are biased into engagement by the flexure. Rotation of the motor shaft across the face of the gear sector causes movement of the actuator arm and thereby the head mounting arm.

More specifically, the flexure comprises a pin that is pressed against and rides in a notch in one end of the actuator arm to define the actuator pivot point. The opposite end of the actuator arm which has gear sectors defined on the face thereof is biased against the pinion on the shaft of the actuator motor.

To maintain the preload, means are provided for biasing the pin into the notch and against the end of the actuator arm. This biased pivot includes a curved surface located directly behind the pivot pin, and a rod extending at about a 90° angle to the actuator arm, the rod having a wedge-shaped end inserted between the pin and the curved surface. This wedge serves to constantly press the pin against the notch, so that shocks transmitted along the length of the actuator arm which might otherwise disengage the actuator motor shaft and actuator arm head are instead absorbed. The rod and wedge are not affected because they extend along an axis at an angle to the actuator axis along which shocks are transmitted. Preferably, the wedge is biased in place behind the pin by a spring along an axis of the rod which is at a 90° angle with the axis running along the length of the actuator arm and along which shocks will be transmitted and the biasing force must therefore b defined. This biased wedge constantly takes up any slack in the system which might exist along the actuator arm axis, providing a constant preload to the actuator arm and compensating for wear.

In an alternative embodiment, a flexure supports the pin, the rod extending between the flexure and the housing wall. A cylinder slides on the end of the rod and is biased into position behind the flexure by a spring carried on the rod. The cylinder is wedged between the flexure and wall in general alignment with the actuator arm and presses the pin into the notch.

Using these embodiments, the normal bearing pivot assembly for the actuator arm is eliminated. A low cost, easily assembled disc drive assembly is provided using a minimum number of parts. Off-tracking with shock is minimized because of the biasing forces presented along the actuator arm axis. The effects of tooth wear of the gear sector or pinion will cause minimal off-track radially since the wear causes mostly tangential motion of the head on the track. Also, the biasing force keeps the gear sectors pressed tightly against the pinion on the spring drive shaft so that contact between the gear teeth on the actuator arm and the pinion on the actuator motor shaft does not diminish with time.

In one embodiment hereof, the actuator arm is formed of a self-lubricating polymer or other light-weight self-lubricating material. Wear on the gear is reduced; and as the teeth are worn, the gear is still tightly biased against the pinion to maintain accurate movement of the actuator arm with rotation of the pinion.

BRIEF DESCRIPTION OF THE DRAWINGS

The features and advantages herein will be better understood with reference to the following figures:

FIG. 2 is an expanded, detailed view of the flexure used to mount the actuator arm of this invention, and the biasing means used with this arm;

FIG. 3A is a perspective view of the biasing support for the actuator arm in the disc drive of FIGS. 1 and 2;

FIGS. 3B and 3C are detailed views of the biasing wedge in the disc drive housing of this invention;

FIG. 4 is a plan view of an alternate embodiment of this invention.

DETAILED DESCRIPTION OF A PREFERRED EMBODIMENT

Figure 1:
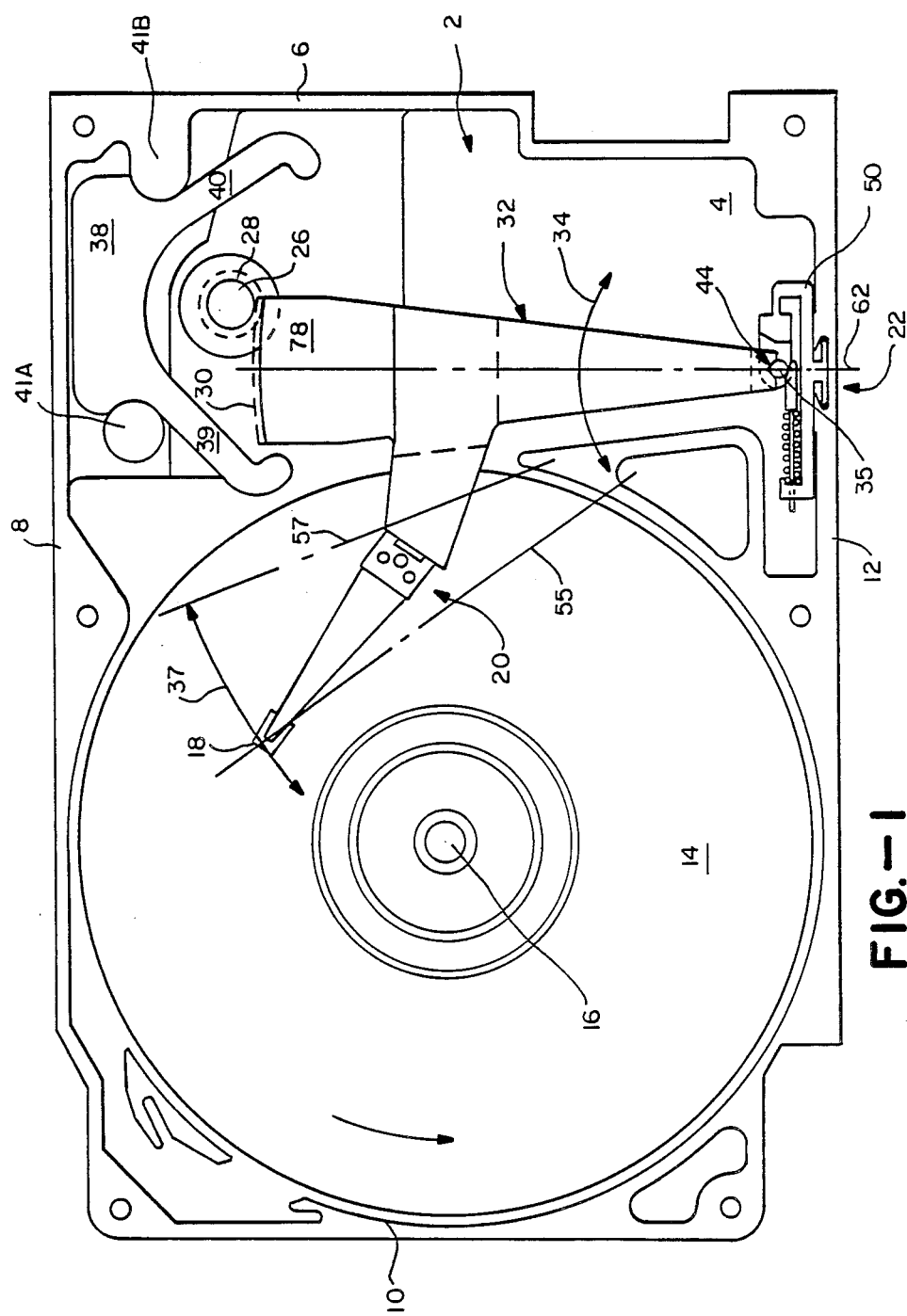
FIG. 1 is a top plan view of the major elements of the disc drive designed in accordance with this invention.

In the figures, like components are designated by like reference numbers. In to FIG. 1, the major elements of a disc drive are shown including a housing 2 including a baseplate 4 and upright walls 6, 8, 10, 12. The integral casting for the base of this disc drive is disclosed in greater detail in the incorporated application.

A data storage disc 14 is mounted within the housing for rotation about a spindle 16, and a transducer 18 is provided for reading and writing data on the disc. The transducer 18 is positioned using a head actuator arm assembly combination generally indicated at 20.

The arm assembly 20 pivots around a biasing mounting mechanism 22, including a unique arm preload device described in detail below. This pivoting movement of arm assembly 20 is caused by rotation of a actuator motor (not shown) mounted beneath the baseplate 4, with its shaft 26 extending up through the baseplate 4. The actuator motor shaft 26 has a pinion 28 machined thereon to mesh with gear teeth 30 on the end of actuator arm 32. Therefore, it is clear that rotation of the motor pinion 28 across the face of the gear sector 30 causes movement of the arm assembly 20 generally along the arc illustrated by arrow 34. As the actuator arm 32 moves, it pivots about a theoretical pivot point 35 to move the transducer 18 from track to track along arc 37. A crash stop 38 for the actuator arm 32, comprising a pair of arms 39, 40 supported on either side of the actuator motor shaft to capture the head 78 of the actuator arm 32 before it can exceed its permitted length of travel. The crash stop comprises a plastic or other suitable material element 38 captured on pins 41A, 41B, which rise out of the base casting near the ends of arms 39, 40. By providing this pin mounting and defining an elbow bend in each arm 39, 40 near the end of each arm, a sure and definite crash stop is provided without creating excessive deceleration forces.

The biasing support 50 functions to maintain the alignment of the actuator arm 32 with the actuator motor 26 as explained below with reference to FIGS. 1-2. As clearly appears therein, the pin 44 is captured in a V-shaped holder 76 carried on the end of the actuator arm 32. The opposite end 78 of the actuator arm 32 is pressed against the pinion 28. In order to maintain horizontal alignment of the arm 32 parallel to the discs rotating in the disc drive, the inner end 78 of the actuator arm 32 includes upper and lower finger portions which butt against the upper and lower portions 44A, B of the pin 44. The upper and lower portions of the arm also serve to define a cutout region at the end of the actuator arm 32 to reduce the friction between the arm and the pin 44.

By adopting this design of a bias support as in FIGS. 1-2, a strong biasing force is effectively defined along a line 62 that would pass through the center line of the gear sector 30, pivot pin 44, and, when the actuator arm is centered thereon, the actuator motor drive shaft 26. A strong force is always exerted to maintain the gear sector teeth on the sector face 30 in tight coupling transmission arrangement with the pinion 28, so that even with wear or shock, a tight connection is established.

A bearingless pivot about the phantom pivot point 35 for the actuator arm 32 is now defined. Thus, the transducer 18 can be smoothly and efficiently moved from inner track (radius 55 through pivot 35) to outer track 57 (defining radius 59 through pivot 35).

However, a problem that must be addressed is that shocks may be applied to the disc drive having an effective force along this actuator arm center line 62, which could result in even momentary disengagement of the gear sector 30 and pinion 28. Such a shock could easily result in misalignment of the transducer 18 with the targeted track on the disc. Hence, a design feature has been adopted to provide an additional bracing force of the actuator arm and sector face 30 against the pinion 28. Specifically, as shown in FIG. 2, a cylindrical surface 60 is located behind the pivot pin 44. As shown in FIG. 1, this cylindrical surface comprises a wedge 40 biased into position behind the actuator arm 32, and captured at a point substantially directly behind the pivot 44. The biasing force against wedge 40 to hold it in place is established by a spring 56 whose force is along the axis of the rod 48 that is attached to wedge 40. A biasing force in the direction of arrow 63 prevents withdrawal of the wedge 40 from behind the actuator arm 32, and prevents any sudden movement of the arm 32 and its gear sector face 30 away from the pinion 28. The angle of wedge 40 is chosen so that in the event of a shock to actuator arm 32 along axis 62 there is no diminution of the force 63 holding wedge 40 in place.

A preferred embodiment of the biasing preload assembly discussed above is shown incorporated in the disc drive in FIG. 1, and in more detailed form in FIGS. 2, and 3A, B, C. In this embodiment, the biasing force is provided by a wedge-shaped element 40, captured between pivot pin 44 and cylindrical surface 60. This wedge-shaped element 40 is carried on the end of a rod 48 which is located in an integral support element 50. The opposite end 52 of the rod 48 is captured in the end 58 of the integral support element 50, shown in perspective view in FIG. 3A. A spring 56 which clearly appears in FIG. 2 slides over rod 48 and is held under tension between wedge 40 and end piece 58 of support 50.

This spring 56, presses against the rear of the wedge-shaped element 40 and is captured in the end 58 of the support 50 to bias the wedge tightly between the pivot pin 44 and the cylindrical surface 60, so that a strong biasing force is always created along the radius line 62 (FIG. 1) of the actuator arm 32.

The wedge-shaped end 40 which comprises the biasing element is in fact formed in a U shape comprising upper and lower portions 40A, B to cooperate with the upper and lower portions 44A, B of the pivot pin 44.

To assemble the biasing structure of FIG. 2, the end of the rod 48, having spring 56 already in place, slides through slot 64 in the rear of the support, the wedge 40 being captured between pin 44 and surface 60, the spring 56 being released to be captured in end piece 58. The end of rod 48 extends through slot 64 in the support piece 58 so that the wedge 40 is free to move behind the biasing pin 44, and so the entire piece can be assembled easily. The arm 66 of support 50 carrying pin 44 has a thin section 68 which functions as a hinge when the wedge 40 extends behind pin 44 as shown in FIG. 2. To fix the support 50 on the housing wall, a wing-shaped element 72 is provided on the back of support 50. Wing 72 mates with slot 74 in the housing wall. The wing 72 may be deformed slightly when being inserted. On release, the elastic force of the wing being released inside the slot will hold support 50 in place relative to wall 12.

The essential elements of an alternative embodiment of a supporting assembly are shown in FIG. 4. This biasing, actuator arm preload assembly essentially comprises a flexure formed of a metal strip 80 supported on the end wall 12 of the housing 2. The support point is not critical. It is only essential that the flexure 80 be free to move in a horizontal plane, i.e., parallel to the surface of a disc recording medium 14. The strip 80 has some flexibility, so that it may be pressed toward the actuator arm 32 by the biasing cylinder 82. Strip 80 is essentially an elastic hinge for controlled movement of pin 44.

The flexure 80 supports a pin 44 which is pressed into a channel-shaped member 46. Arm 32 carrying the gear sectors 30 is pressed against the pinion 28 formed on the surface of drive shaft 26 of the actuator motor. Therefore, as discussed above, rotation of the actuator motor 26 will cause selective movement of the actuator arm 32 along arc 34 and thereby, selective positioning of the transducer head 18. Cylinder 82 slides on rod 84, and is biased into position behind pivot pin 44 in the same manner as the preferred embodiment by spring 56. In this embodiment however, since the cylinder slides freely, the opposite end 88 of rod 84 may be fixed in frame 90 which is screw mounted 92 on base 4 to hold rod 84 in place.

In a further alternative, the actuator arm 32 may be formed of the two sections. The first section would be chosen of an appropriate material for thermal compensation, so that the length of the actuator arm between pivot pin 44 and shaft 26 does not change significantly with changes in temperature. The second portion of the arm is chosen of a wear resistant, low friction material so that the pivot pin 44 pivots easily against the V-shaped groove 76 formed in the rear of the second arm section.

Other alternatives to this invention may be apparent to a person of skill in the art who studies this disclosure. Therefore, the scope of this invention is to be limited only by the following claims.

What is claimed:

1. A rotary actuator head positioning apparatus located within the housing of a disc drive comprising means for positioning a transducer relative to a disc-shaped recording medium within the housing, including
an elongate arm assembly extending along the side of said disc movable in the housing for positioning the transducer,
a transducer mounting arm extending to one side of said elongate arm assembly and over said disc, said arm assembly being movable in said housing in a plane parallel to said disc-shaped medium for positioning said transducer relative to said medium,
one, supported elongate end of said arm assembly being supported by support means at a pivot point for said arm,
stepper motor means mounted in the housing and comprising a stepper motor coupled to a driven end of the arm assembly distal from said arm assembly support end, and
transmission means between said arm assembly and said motor comprising a pinion on said motor shaft and a gear sector on a face of the arm assembly, the gear and pinion being biased into engagement by spring means so that with rotation of said stepper motor said arm assembly positions said transducer selectively over tracks on the disc.

2. A head positioning apparatus as in claim 1 wherein said supported end of said arm assembly includes a V-shaped groove, said support means comprising a flexible U-shaped support element carrying a pin which fits within said groove, said pin and groove defining a pivot point for said arm assembly.

3. A head-positioning apparatus as in claim 2 including a biasing element slidable between said pin and an end wall of said housing and generally aligned with said pivot point of said elongate arm and the shaft of said motor to prevent shocks to said elongate arm from disengaging said gear and pinion coupling said elongate arm and said motor.

4. A head positioning apparatus as in claim 3 wherein said biasing element comprises a wedge on a rod extending behind said pin and said arm assembly, a face of the wedge forming an angle with the axis of the arm assembly to prevent the force of any shock to said arm from backing said wedge out from behind said flexure.

5. A head positioning apparatus as in claim 4 including spring means carried on said rod and establishing a spring force against said wedge along said rod in a direction to bias wedge behind said pin and prevent said wedge from being backed out from behind said arm.

6. A head positioning apparatus as in claim 5 wherein said pin is carried on one leg of a U-shaped support member, another leg of said U-shaped member carrying an element which mates with a slot on a wall of said housing.

7. A head positioning apparatus as in claim 6 wherein said legs of said support member are joined at the base of said U-shaped element, said base comprising a relatively thin section which functions as a hinge to allow said pin to be located behind said supported end of said elongate arm assembly and bias the driven end against motor pinion.

8. A head positioning apparatus as claimed in claim 7 wherein said pin comprises upper and lower portions separated by an extended portion of said leg, said wedge including upper and lower sections to bias said pin into engagement with said supported end of said actuator arm.

* * * * *